(No Model.)

C. L. MARBURG.
DEVICE FOR SPRINKLING CASING MATERIAL UPON TOBACCO.

No. 519,191. Patented May 1, 1894.

WITNESSES:
A. O. Babendreier.
H. MacCarthy.

Charles L. Marburg
INVENTOR
By Price & Stewart
ATTORNEYS.

THE NATIONAL LITHOGRAPHING COMPANY,
WASHINGTON, D. C.

UNITED STATES PATENT OFFICE.

CHARLES L. MARBURG, OF BALTIMORE, MARYLAND, ASSIGNOR OF ONE-HALF TO THE AMERICAN TOBACCO COMPANY, OF NEW JERSEY.

DEVICE FOR SPRINKLING CASING MATERIAL UPON TOBACCO.

SPECIFICATION forming part of Letters Patent No. 519,191, dated May 1, 1894.

Application filed November 24, 1893. Serial No. 491,833. (No model.)

*To all whom it may concern:*

Be it known that I, CHARLES L. MARBURG, of the city of Baltimore and State of Maryland, have invented a new and useful Improvement in Devices for Sprinkling Casing Material upon Tobacco, of which the following is a specification.

Figure 1:
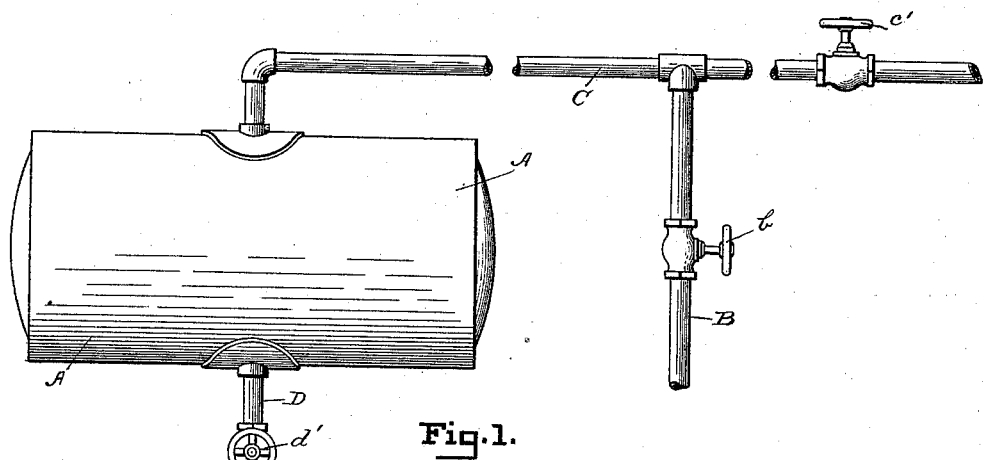
Figure 2:
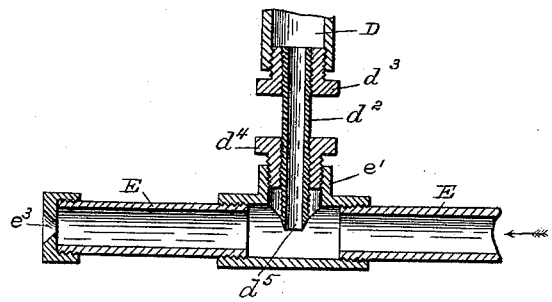
Figure 3:
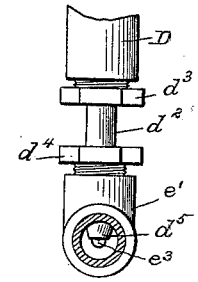

Figure 1 of the drawings represents the apparatus showing the tank, the supply pipe for the casing, air pressure pipe, and ejection pipe; Fig. 2, a vertical longitudinal section of the ejection pipe and its connections; Fig. 3 an end view of the parts shown in Fig. 2.

The casing which is to be ejected and sprayed upon the material, as at present known to the trade is usually made of a semi-liquid consistency somewhat sticky and sluggish in running through pipes or tubes by reason of the friction or adhesion of the material to the walls of the tubes. The spraying device forming the subject of this application will apply to all forms of such semi-liquid matter.

A is a tank supplied with the casing material through the pipe B which is connected with a supply receptacle not shown in the drawings, and is provided with the cock $b$.

C is an air pressure pipe provided with the cock $c'$ through which a pressure of air is supplied to the tank A which occupies the space between the top of the casing material and the upper inner wall of the tank. The pipe C is connected with an air pressure supply not shown in the drawings. From the bottom of the tank projects the pipe D provided with the cock or valve $d'$. Below the valve the pipe D extends and is of the same general area until it is contracted by a smaller pipe, or otherwise, as shown at $d^2$. A convenient way of contracting this pipe is illustrated in Figs. 2 and 3, wherein the main pipe D is shown of full size provided with a bushing $d^3$ inserted in its opening and the pipe $d^2$ is then inserted in the end of the bushing. The pipe $d^2$ may be inserted directly into the pipe E or it may be formed as shown in Fig. 2 in the form of a T-shaped connection $e'$, having an opening for the insertion of the bushing $d^4$ and openings for inserting the pipe E, which may be two pipes as shown in the drawings. The pipe E is connected with an air-pressure supply not shown in the drawings and is provided with the valve or cock $e^2$. I find by experiment it is better that the opening of the pipe $d^2$ into the pipe E be projected down until it reaches somewhere near the center of the pipe. This opening is shown at $d^5$. Any suitable spraying device may be connected with the end of the pipe E, but the one which I have shown and illustrated marked $e^3$ in the drawings is a cone-shaped opening with its apex projecting inwardly.

Now the operation of the device is as follows: The casing or other material to be sprayed is first placed in the tank A through the pipe B. The cock $b$ is then closed. The cock $c'$ in the air-pressure pipe C is opened which allows a pressure of air to enter into the space above the casing material and exert a pressure thereon. The cocks $e^2$ and $d'$ are then opened supplying pressure to the pipe E and forcing the semi-liquid material through and out of the aperture $e^3$ in the end of that pipe. Now should the opening $e^3$ in the end of the pipe be very small so that the material would be sluggish in making its escape there would be generated in the pipe E a back pressure the effect of which would be to stop the flow of the material through the contracted area of the pipe $d^2$, and in order to provide against such a contingency I arrange the pressures preferably so that the pressure on top of the liquid in the tank A is greater than the pressure through the pipe E which ejects the casing through the aperture and in this way I have found that I may at all times have not only a regulated supply of casing through the pipe $d^2$ but also a regulated supply of the spray of the material upon the tobacco.

I have described the above apparatus as operating with pressures of air, but it is plain that the two pressures may be of steam or any other so long as they operate in this way, or one of the pressures may be an air-pressure, and the other a steam-pressure.

What I claim, and desire to secure by Letters Patent, is—

1. In a spraying device a tank or receptacle containing the material to be sprayed, means for supplying a pressure to force the material out of the tank, and means for regulating the same in combination with a tube or pipe to receive the casing from the receptacle provided with a spraying device, a valve controlled connection between the two to regulate the flow of the casing, and means for supplying an additional pressure through the receiving pipe to eject it therefrom through the spraying device.

2. In a spraying device a tank or receptacle containing the material to be sprayed, means for supplying pressure to force the liquid out of the tank, and means for regulating the same in combination with a tube or pipe to receive the casing when forced from the receptacle provided with a spraying device, a valve controlled connection between the two to regulate the flow of the casing, means for supplying an additional pressure through the receiving pipe to eject it therefrom through a spraying device, and means for regulating the latter pressure, substantially as described.

3. In a spraying device a tank or receptacle containing the material to be sprayed, means for supplying a pressure to force the material out of the tank and means for regulating the same, in combination with a tube or pipe to receive the casing from the receptacle provided with a spraying device, a valve controlled connection between the two provided with a contracted conduit, means for supplying an additional pressure through the receiving pipe and means for regulating the pressure, substantially as described.

Signed at Baltimore, in the State of Maryland, this 21st day of November, A. D. 1893.

CHARLES L. MARBURG.

Witnesses:
JOHN L. HEBB,
PAUL WEITTACHER.